(12) United States Patent
Shimodaira et al.

(10) Patent No.: US 6,331,882 B1
(45) Date of Patent: Dec. 18, 2001

(54) OPTICAL MEMBER, CELL SUBSTRATE AND LIQUID-CRYSTAL DISPLAY

(75) Inventors: Kiichi Shimodaira; Masayuki Satake, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/437,141

(22) Filed: Nov. 10, 1999

(30) Foreign Application Priority Data

Nov. 26, 1998 (JP) .................................................. 10-353887

(51) Int. Cl.⁷ ....................... G02F 1/1333; G02F 1/1335; B32B 9/00; B32B 7/02
(52) U.S. Cl. ........................... 349/122; 349/96; 349/158; 349/117; 428/40.1; 428/215
(58) Field of Search ................................ 349/122, 7, 158, 349/98, 117, 112, 96, 115, 12; 428/215, 40.1, 345, 355

(56) References Cited

U.S. PATENT DOCUMENTS

| | | | |
|---|---|---|---|
| 4,292,370 | * 9/1981 | Pekko | 428/40.1 |
| 4,358,494 | * 11/1982 | Akimoto et al. | 428/40.1 |
| 4,387,133 | * 6/1983 | Ichikawa et al. | 428/215 |
| 5,880,800 | * 3/1999 | Mikura et al. | 349/122 |
| 6,040,026 | * 3/2000 | Iwabuchi et al. | 428/40.1 |

* cited by examiner

Primary Examiner—Toan Ton
(74) Attorney, Agent, or Firm—Sughrue, Mion, Zinn, Macpeak & Seas, PLLC

(57) ABSTRACT

An optical member is made from an optical material either one of or each of two surfaces of which is coated with a pressure sensitive adhesion layer having a 1000% elastic modulus in a range of from 3 g/mm² to 10 g/mm² at 90° C. The optical member exhibits characteristic in which the quantity of curl is not larger than 3 mm per 12 inches when the optical member adhesively bonded to a resin substrate through the pressure sensitive adhesion layer is heated at 80° C. for 150 hours. A cell substrate comprises a resin substrate having a curl quantity of not larger than 3 mm per 12 inches when an optical member is heated at 80° C. for 150 hours after the optical member is adhesively bonded to the resin substrate through the pressure sensitive adhesion layer. A liquid-crystal display wherein an optical member is adhesively bonded, through a pressure sensitive adhesion layer of the optical member, to either one of or each of two surfaces of a liquid-crystal cell is formed by use of the cell substrate.

11 Claims, 1 Drawing Sheet

OPTICAL MEMBER, CELL SUBSTRATE AND LIQUID-CRYSTAL DISPLAY

BACKGROUND OF THE INVENTION

1. Field of the Invention

The present invention relates to an optical member being additionally provided with a pressure sensitive adhesion layer, which is capable of forming a resin type liquid-crystal cell little warped and suitable for producing a liquid-crystal display, or the like, and a resin type cell substrate therefor.

The present application is based on Japanese Patent Application No. Hei. 10-353887 which is incorporated herein by reference.

2. Description of the Related Art

Since a liquid-crystal cell using a glass substrate has become heavy and bulky with the advance of increase in size of a liquid-crystal display (LCD), or the like, variety of liquid-crystal cells using various kinds of resin substrates have been proposed for the purpose of reduction in size and weight, or the like. The resin type liquid-crystal cells heretofore proposed, however, have been not put into practical use yet because a warp (curl) problem occurred when an optical material such as a polarizing plate, a phase-difference plate, an elliptically polarizing plate formed by lamination thereof, or the like, was adhesively bonded to each of the liquid-crystal cells through an adhesive layer. The aforementioned optical material such as a polarizing plate, or the like, is a key device for the LCD. Accordingly, use of the optical material cannot be avoided.

SUMMARY OF THE INVENTION

An object of the present invention is to develop an optical member which can form a liquid-crystal cell little warp and excellent in performance in practical use when an optical material is adhesively bonded through an adhesive layer, and a resin type cell substrate therefor.

The present invention provides an optical member made from an optical material either one of or each of two surfaces of which is coated with a pressure sensitive adhesion layer having a 1000% elastic modulus in a range of from 3 g/mm² to 10 g/mm2 at 90° C., wherein the optical member exhibits characteristic in which the quantity of curl is not larger than 3 mm per 12 inches when the optical member adhesively bonded to a resin substrate through the pressure sensitive adhesion layer is heated at 80° C. for 150 hours.

Further, the present invention provides a cell substrate comprising a resin substrate having a curl quantity of not larger than 3 mm per 12 inches when such an optical member as defined above is heated at 80° C. for 150 hours after the optical member is adhesively bonded to the resin substrate through the pressure sensitive adhesion layer, and provides a liquid-crystal display wherein such an optical member as defined above is adhesively bonded, through a pressure sensitive adhesion layer of the optical member, to either one of or each of two surfaces of a liquid-crystal cell formed by use of such a cell substrate as defined above.

By provision of an optical member having a pressure sensitive adhesion layer with the aforementioned characteristic, the warp of a resin type thin and light liquid-crystal cell can be reduced practically sufficiently while advantages of the resin type liquid-crystal cell are used effectively. Accordingly, increase in size of an LCD, or the like, due to a resin type cell substrate can be promoted advantageously. Further, by the provision of an optical member having a pressure sensitive adhesion layer additionally provided onto an optical material in advance, the optical member can be adhesively bonded to a liquid-crystal cell easily. Accordingly, efficiency in assembling an LCD is excellent, so that assembling loss, or the like, caused by both variation in quality and contamination with dust, or the like, can be prevented.

DETAILED DESCRIPTION OF THE PREFERRED EMBODIMENTS

An optical member according to the present invention is made from an optical material either one of or each of two surfaces of which is coated with a pressure sensitive adhesion layer having a 1000% elastic modulus in a range of from 3 g/mm² to 10 g/mm² at 90° C. The optical member exhibits characteristic in which the quantity of curl is not larger than 3 mm per 12 inches when the optical member adhesively bonded to a resin substrate through the pressure sensitive adhesion layer is heated at 80° C. for 150 hours.

Figure 1:
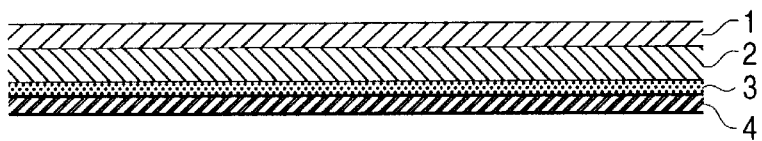
FIG. 1 is a sectional view of an example of an optical member.
Figure 2:
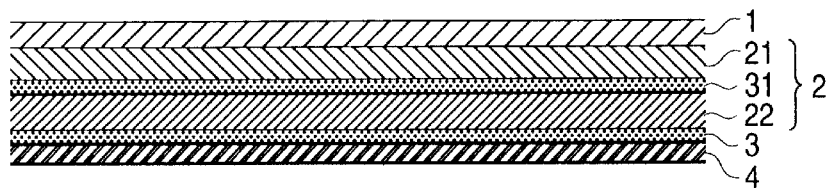
FIG. 2 is a sectional view of another example of the optical member.

FIGS. 1 and 2 show examples of the optical member. The reference numeral 2 designates an optical material; and 3, a pressure sensitive adhesion layer. In FIG. 2, the reference numeral 21 designates a polarizing plate; and 22, a phase-difference plate. The polarizing plate 21 and the phase-difference plate 22 are laminated through a pressure sensitive adhesion layer 31 to thereby form an elliptically polarizing plate as an optical material 2. Incidentally, the reference numeral 1 designates a protective film; and 4, a separator.

As the optical material, there is used an optical material such as a polarizing plate, a phase-difference plate, an elliptically polarizing plate formed by lamination of the polarizing plate and the phase-difference plate, a reflection type polarizing plate, an elliptically polarizing plate using the reflection type polarizing plate, or the like, used for formation of a liquid-crystal display, or the like. The optical material as to the kind thereof is not limited specifically. Incidentally, in the case of a laminate type optical material such as an elliptically polarizing plate, any suitable adhesively bonding means such as a pressure sensitive adhesion layer in the present invention, another pressure sensitive adhesion layer, or the like, can be used for the lamination.

Incidentally, specific examples of the polarizing plate include: drawn hydrophilic macromolecular films, such as polyvinyl alcohol type films, partially formalized polyvinyl alcohol type films, and ethylene-vinyl acetate copolymer type partially saponified films, containing iodine and/or dichromatic dye adsorbed thereon; and polyene oriented films, such as dehydrates of polyvinyl alcohol, and dehydrochlorinates of polyvinyl chloride; and so on. The thickness of the polarizing plate made from such a film is generally in a range of 5 μm to 80 μm but is not limited thereto.

Incidentally, the reflection type polarizing plate is used for formation of a liquid-crystal display of the type for reflecting incident light from the visible perception side (display side) to perform display, or the like. The reflection type polarizing plate has an advantage that a built-in light source for back-lighting, or the like, can be omitted so that reduction in thickness of the liquid-crystal display is attained easily, and so on.

The formation of the reflection type polarizing plate can be performed by any suitable method such as a method of additionally providing a reflection layer of a metal, or the like, onto a single surface of a polarizing plate through a transparent resin layer, or the like, as occasion demands. The aforementioned polarizing plate, especially the transparent resin layer provided on either one of or each of the opposite surfaces of the polarizing film as occasion demands, can be configured so that the protective film 1 serves also as the transparent resin layer as shown in the drawings.

A specific example of the reflection type polarizing plate is a polarizing plate having a reflection layer formed by additional provision of foil or vapor deposition film of a reflective metal such as aluminum, or the like, onto a single surface of a transparent resin layer of a protective film, or the like, matted as occasion demands. Another example is a polarizing plate having a fine-rough-structure reflection layer on a surface fine rough structure formed from the aforementioned transparent resin layer containing fine particles. Incidentally, the mode of use in a state in which the reflection surface is coated with a transparent resin layer, a polarizing plate, or the like, is preferable in terms of preventing the reflection factor from lowering due to oxidation, holding the initial reflection factor for a long term, avoiding additionally separately providing a protective layer, and so on.

The aforementioned fine-rough-structure reflection layer has an advantage that incident light is diffused by diffused reflection so that both directivity and glaring appearance can be prevented, and unevenness in light and shade can be suppressed. Further, the transparent resin layer containing fine particles has an advantage that incident light and reflected light due to the reflection of the incident light is diffused when the light passes through the transparent resin layer so that unevenness in light and shade can be suppressed. The formation of the fine-rough-structure reflection layer influenced by the surface fine rough structure of the transparent resin layer can be performed by directly applying a metal onto a surface of the transparent resin layer by any suitable one of vapor deposition and plating methods such as a vacuum vapor deposition method, an ion plating method, a sputtering method, and so on.

Incidentally, a polymer, or the like, excellent in transparency, mechanical strength, heat stability, water shielding characteristic, etc. is preferably used for the formation of the protective film or the transparent protective layer. Examples of the polymer include polyester type resins, acetate type resins, polyether sulfone type resins, polycarbonate type resins, polyamide type resins, polyimide type resins, polyolefin type resins, acrylic type resins, acrylic type heat-curable or ultraviolet-curable resins, urethane type heat-curable or ultraviolet-curable resins, acrylic urethane type heat-curable or ultraviolet-curable resins, epoxy type heat-curable or ultraviolet-curable resins, silicone type heat-curable or ultraviolet-curable resins, and so on.

The transparent protective layer may be formed by any suitable method such as a method of applying a polymer, a method of laminating polymers provided as films, or the like. The thickness of the transparent protective layer may be determined suitably. The thickness of the transparent protective layer is generally selected to be not larger than 500 $\mu$m, preferably in a range of from 1 $\mu$m to 300 $\mu$m, especially in a range of from 5 $\mu$m to 200 $\mu$m. Incidentally, transparent fine particles such as inorganic fine particles of silica, alumina, titania, zirconia, tin oxide, indium oxide, cadmium oxide, antimony oxide, etc., for example, with a mean particle size of from 0.5 $\mu$m to 20 $\mu$m, and organic fine particles of crosslinked or non-crosslinked polymers, etc., are used as the fine particles contained for the formation of the transparent resin layer having the surface fine rough structure. The inorganic fine particles may be electrically conductive. The amount of use of the fine particles is generally from 2 parts by weight to 25 parts by weight, especially from 5 parts by weight to 20 parts by weight per 100 parts by weight of the transparent resin.

On the other hand, specific examples of the phase-difference plate as one of the aforementioned optical materials include: a birefringent film formed by drawing a film of any suitable polymer such as polycarbonate, polyvinyl alcohol, polystyrene, polymethyl methacrylate, polypropylene, other polyolefins, polyallylate, polyamide; an oriented film of a liquid-crystal polymer; and so on. The phase-difference plate may be formed by lamination of two kinds or more of phase-difference layers so that optical characteristic such as phase difference, or the like, is controlled.

Further, the elliptically polarizing plate or the reflection type elliptically polarizing plate as one of the aforementioned optical materials is formed by lamination of a suitable combination of polarizing plates or reflection type polarizing plates and phase-difference plates. Although the elliptically polarizing plate, or the like, can be formed by laminating (reflection type) polarizing plates and phase-difference plates successively separately in a process of production of a liquid-crystal display to obtain a combination thereof, the elliptically polarizing plate, or the like, formed in advance in the aforementioned manner is excellent in quality stability, laminating efficiency, etc. so as to have an advantage that efficiency in production of the liquid-crystal display can be improved.

The pressure sensitive adhesion layer provided on either one of or each of two surfaces of the optical material has a 1000% elastic modulus in a range of from 3 g/mm$^2$ to 10 g/mm$^2$ at 90° C. Accordingly, the curl of the resin substrate can be reduced to a practical use level when the optical member provided with the pressure sensitive adhesion layer is adhesively bonded to a resin substrate. If the elastic modulus is smaller than 3 g/mm$^2$, there is a fear that not only air bubbles are generated in the pressure sensitive adhesion layer but also rising (peeling) occurs in the optical member. If the elastic modulus is larger than 10 g/mm$^2$, there is a tendency that warp occurs in the liquid-crystal cell.

The pressure sensitive adhesion layer which is preferable in terms of prevention of air bubbles and rising of the optical member and suppression of the warp of the liquid-crystal cell, has a 1000% elastic modulus in a range of from 4 g/mm$^2$ to 9 g/mm$^2$, especially in a range of from 4.5 g/mm$^2$ to 8 g/mm$^2$ at 90° C. Although the adhesive force is not limited specifically, the adhesive force is preferably set to be in a range of from 400 g to 1000 g per 25 mm on the basis of 90° peeling (a temperature of from the room temperature to 70° C. and a peeling rate of 300 mm/min, which shall apply hereinafter) from the resin substrate in terms of recycling of the liquid-crystal cell at the time of mistaken adhesive bonding.

A pressure sensitive adhesion composition or an adhesive agent containing a suitable polymer such as an acrylic type polymer, a silicone type polymer, polyester, polyurethane, polyether, synthetic rubber, or the like, as a base polymer can be used for the formation of the pressure sensitive adhesion layer. It is not limited specifically. Above all, a material, such as an acrylic type adhesive agent, excellent in optical transparency, exhibiting moderate pressure sensitive adhesion properties of suitable for wetness, cohesiveness and adhesiveness and excellent in weather resistance, heat resistance, etc., can be used preferably.

A pressure sensitive adhesion layer low in coefficient of moisture absorption and excellent in heat resistance in addition to the above description is preferable in terms of prevention of foaming and peeling phenomena caused by moisture absorption, prevention of lowering of optical characteristic caused by thermal expansion, etc., formation of a liquid-crystal display excellent in quality and durability, and so on.

The pressure sensitive adhesion layer may contain any suitable additives such as fillers, pigments, colorants, antioxidants, etc., for example, selected from natural or synthetic resins, especially tackifiers, glass fibers, glass beads, metal powder materials and other inorganic powder materials, etc. if the additives can be added to the pressure sensitive adhesion layer. The pressure sensitive adhesion layer may also contain fine particles so as to exhibit light diffusibility.

The additional provision of the pressure sensitive adhesion layer on either one or each of the two surfaces of the optical material can be performed by a suitable method. Examples of the method include: a method in which a pressure sensitive adhesion composition is dissolved or dispersed in a suitable single solvent such as toluene, ethyl acetate, or the like, or in a mixture solvent thereof so that from about 10% by weight to about 40% by weight of an adhesive agent solution is prepared and then the adhesive agent solution is directly applied onto the optical material by a suitable spreading means such as a flow-casting means, a coating means, or the like; a method in which a pressure sensitive adhesion layer is formed on a separator according to the aforementioned method and then transferred onto the optical material; and so on.

The pressure sensitive adhesion layer may be provided as a superimposed layer made from different compositions or kinds so that the superimposed layer can be provided on either one or each of the two surfaces of the optical material. Further, when pressure sensitive adhesion layers are to be provided on both surfaces of the optical material, the pressure sensitive adhesion layers different in compositions or kinds may be provided on the front and rear surfaces of the optical material, respectively. The thickness of the pressure sensitive adhesion layer can be determined suitably in accordance with the purpose of use, or the like, and is generally in a range of from 1 to 500 $\mu$m. When the pressure sensitive adhesion layer is exposed to a surface, it is preferable that the surface is coated with a separator 4, or the like, so as to be protected as shown in the drawings until the optical material is put into practical use.

Incidentally, each of the layers for forming the optical member such as a polarizing plate, a phase-difference plate, a protective film, a transparent protective layer, a pressure sensitive adhesion layer, or the like, can be made to have ultraviolet absorption power by a suitable method such as a method of treating the layer with an ultraviolet absorbent such as a salicylic acid ester type compound, a benzophenol type compound, a benzotriazole type compound, a cyanoacrylate type compound, a nickel complex salt type compound, or the like.

The optical member according to the present invention can be adhesively bonded to a suitable device such as a liquid-crystal cell, or the like. Especially, the optical member can be used advantageously when the optical member is adhesively bonded to a liquid-crystal cell using, as a cell substrate, a resin substrate having a curl quantity of not larger than 3 mm per 12 inches particularly when the optical member adhesively bonded to the resin substrate through the pressure sensitive adhesion layer is heated at 80° C. for 150 hours.

The aforementioned resin substrate can be formed from a suitable resin such as a thermoplastic resin, a heat-curable resin, or the like. The resin substrate which can be used preferably in terms of heat resistance, or the like, at the time of provision of a transparent electrically conductive film, is made from a resin having a glass-transition temperature of not lower than 130° C., especially not lower than 150° C., preferably not lower than 160° C.

Further, the resin substrate is preferably excellent in transparency and impact resistance, especially the resin substrate preferably has a light permeability of not lower than 80%. Further, the resin substrate is preferably excellent in chemical resistance, optical isotropy, low water absorption characteristic, low moisture permeability and gas barrier characteristic with respect to oxygen, or the like, in terms of prevention of denaturation of a liquid crystal, durability in application to a liquid-crystal cell, and so on. In addition, a resin substrate having a tensile modulus of elasticity of not smaller than $3\times10^4$ kgf/cm$^2$ is preferable in terms of suppressing warp by rigidity which can endure dimensional change due to changes in temperature and moisture of the optical member, or the like.

Incidentally, examples of the resin for forming the resin substrate include: thermoplastic resins such as polycarbonate, polyacrylate, polyether-sulfone, polyester, polysulfone, polymethyl methacrylate, polyether-imide, polyamide, etc.; heat-curable resins such as an epoxy type resin, unsaturated polyester, polydiallyl phthalate, polyisobornyl methacrylate, etc.; and so on. Any one of such resins may be used singly or any two or more kinds selected from such resins may be used in combination. Any one of such resins may be used as a copolymer with another component, a mixture with another component, or the like.

From the aforementioned performance, or the like, the resin substrate which can be used particularly preferably is made from a cured material of an epoxy type composition containing an epoxy type resin, especially an alicyclic epoxy resin, an acid anhydride type curing agent, and a phosphorus type curing catalyst. As the alicyclic epoxy resin, any suitable one selected from various alicyclic epoxy resins can be used without any specific limitation.

Examples of the acid anhydride type curing agent include phthalic anhydride, 3,6-endo-methylene-tetrahydrophthalic anhydride, succinic anhydride, maleic anhydride, hexahydrophthalic anhydride, tetrahydrophthalic anhydride, methyl-hexahydrophthalic anhydride, methyl-tetrahydrophthalic anhydride, and so on. Especially, colorless or light yellow acid anhydrides such as hexahydrophthalic anhydride, tetrahydrophthalic anhydride, methyl-hexahydrophthalic anhydride, methyl-tetrahydrophthalic anhydride, etc. can be used preferably. The amount of the acid anhydride type curing agent to be added is preferably in a range of from 0.5 to 1.3 equivalents per one epoxy equivalent in the epoxy resin.

Examples of the phosphorous type curing catalyst include alkyl phosphines, phosphine oxides, phosphonium salts, and so on. The amount of the phosphorous type curing catalyst to be added is preferably in a range of from 0.2 parts by weight to 10 parts by weight, especially in a range of from 0.5 parts by weight to 4 parts by weight per 100 parts by weight of the acid anhydride type curing agent.

The formation of the resin substrate can be performed by any suitable method such as a casting molding method, a flow-casting molding method, an injection molding method, a roll coating molding method, an extrusion molding method, a transfer molding method, a reaction injection molding method (RIM), or the like. At the time of the formation of the resin substrate, any suitable additives such as a dye, a denaturant, an anti-discoloring agent, an anti-oxidant, an ultraviolet absorbing agent, a releasant, a reactive diluent, a non-reactive diluent, etc. can be added as occasion demands so long as transparency is not spoiled.

The thickness of the resin substrate is preferably not larger than 1 mm, especially not larger than 0.8 mm, further especially in a range of from 0.1 to 0.5 mm in terms of reduction in thickness and weight, strength, prevention of denaturation, and so on. Incidentally, the resin substrate may be formed as a single-layer substance or as a laminate. Accordingly, the thickness of the resin substrate may be achieved as that of a laminate of two or more layers made from one kind of resin or from different kinds of resins.

As occasion demands, a gas barrier layer may be provided on the resin substrate for the purpose of shielding water and oxygen which is a cause of curving the substrate, denaturing the liquid crystal, etc. The gas barrier layer is generally formed from a macromolecular coating film for the purposes of durability, good deformability, and so on. A polymer having a small oxygen permeability coefficient, such as polyvinyl alcohol, partially saponified polyvinyl alcohol, ethylene-vinyl alcohol copolymer, polyacrylonitrile, polyvinylidene chloride, or the like, may be used preferably as the macromolecule. Especially, a vinyl alcohol type polymer is preferable in terms of gas barrier characteristic, water diffusion characteristic, evenness of water absorption, and so on.

The formation of the gas barrier layer can be performed by a macromolecular solution spreading method, or the like, using a suitable coating method such as a casting method, a spin coating method, or the like. The thickness of the gas barrier layer is preferably not larger than 15 μm, especially in a range of from 1 to 10 μm in terms of transparency, prevention of discoloration, gas barrier characteristic with respect to oxygen, water vapor, or the like, and so on.

As occasion demands, a coat layer may be provided on a surface of adhesion of the resin substrate to the pressure sensitive adhesion layer for the purpose of improvement of scuff resistance, or the like, on the basis of control of adhesive power to the pressure sensitive adhesion layer and hardening of the surface. When the resin substrate has the aforementioned gas barrier layer, the coat layer is provided on the gas barrier layer. The coat layer can be formed from a crosslinkable resin suitable for forming a transparent hard film. Especially, an ultraviolet-curable resin such as an urethane acrylate type resin, an epoxy type resin, or the like, using a multifunctional monomer capable of being three-dimensionally crosslinked by ultraviolet radiation through a photocatalyst, or the like, can be used preferably.

The formation of the coat layer may be performed by a method, or the like, in which a resin solution is spread on a resin substrate, a gas barrier layer, or the like, by any suitable coating system such as a casting system, a spin coating system, a dipping system, or the like, and then crosslinked. The thickness of the coat layer can be determined suitably and is generally not larger than 200 μm, especially not larger than 100 μm, further especially in a range of from 1 μm to 50 μm.

As occasion demands, an inorganic oxide layer may be provided on the resin substrate on the transparent electrically conductive film-provision side opposite to the coat layer-provision side for the purpose of improvement of adhesion of the transparent electrically conductive film, or the like. The inorganic oxide layer can be formed from a known inorganic oxide for forming a transparent layer. Especially, the inorganic oxide layer is preferably formed from a hydrolytic condensation polymer of metal alcoxide in terms of the aforementioned adhesion, or the like.

As the metal alcoxide, there can be used any one such as alkoxysilane, alkoxyaluminum, alkoxytitanium, alkoxyantimony, alkoxyzircon, or the like, suitable for forming a transparent inorganic oxide by hydrolytic condensation polymerization. Especially, the metal alcoxide which can be used preferably in terms of easiness of reaction, or the like, is alkoxysilane.

Incidentally, specific examples of the alkoxysilane include: tetraalkoxysilane such as tetramethoxysilane, tetraethoxysilane, tetra-n-propoxysilane, tetraisopropoxysilane, tetra-n-butoxysilane, tetra-sec-butoxysilane, and tetra-tert-butoxysilane; monoalkyltrialkoxysilane such as methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, γ-chloropropyltrimethoxysilane, γ-chloropropyltriethoxysilane, methyltriisopropoxysilane, ethyltriisopropoxysilane, isopropyltriisopropoxysilane, n-propyltriisopropoxysilane, methyltri-n-propoxysilane, ethyltri-n-propoxysilane, isopropyltri-n-propoxysilane, n-propyltri-n-propoxysilane, γ-chloropropyltriisopropoxysilane, γ-chloropropyltri-n-propoxysilane, methyldimethoxyisopropoxysilane, methylmethoxydiisopropoxysilane, ethyldiethoxyisopropoxysilane, ethylethoxydiisopropoxysilane, methyldiethoxyisopropoxysilane, and methylethoxydiisopropoxysilane; and so on.

The formation of the inorganic oxide layer may be performed by a method, or the like, in which a solution of metal alcoxide and water dissolved in a suitable hydrophilic solvent such as alcohol, or the like, is spread on a predetermined surface of the resin substrate by any suitable coating system such as a casting system, a spin coating system, a dipping system, or the like, and heated as occasion demands so that metal alcoxide is hydrolytically condensation polymerized while both water and solvent are vaporized to thereby form an inorganic oxide. The thickness of the inorganic oxide layer thus formed can be determined suitably in accordance with the purpose of use, or the like, and is generally not larger than 50 μm, especially not larger than 20 μm, further especially in a range of from 0.1 μm to 5 μm.

Two or more kinds of metal alcoxide may be used for preparing the aforementioned spread solution. It is further preferable that the pH value of the spread solution is adjusted to be in a range of from 2 to 5 in terms of acceleration of the hydrolytic condensation polymerization reaction. Any suitable acid such as nitric acid, hydrochloric acid, acetic acid, or the like, can be used for the adjustment.

Incidentally, the hydrolytic condensation polymerization reaction of metal alcoxide can progress at the room temperature. It is, however, preferable that metal alcoxide is heated at a temperature of from 80° C. to 200° C. for a time of from 30 minutes to 120 minutes in terms of quickening the reaction.

Further, inorganic oxide particles may be dispersed and contained in the inorganic oxide layer for the purpose of greater improvement of adhesive power of the transparent electrically conductive film, or the like, caused by an anchor effect, or the like, based on a rough structure. Examples of the inorganic oxide particles used include suitable particles exhibiting transparency in the inorganic oxide layer, such as silica particles, alumina particles, titanium oxide particles, antimony oxide particles, zirconia particles, or the like. Especially, alumina particles are preferable.

Figure 3:
FIG. 3 is a sectional view of an example of a cell substrate.
Figure 4:
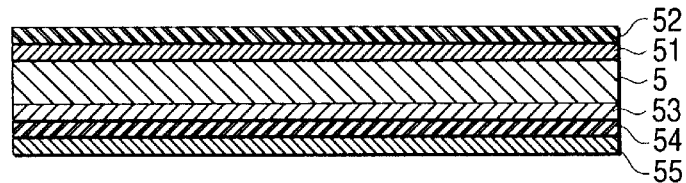
FIG. 4 is a sectional view of another example of the cell substrate.

FIGS. 3 and 4 show examples of the cell substrate made from the resin substrate according to the present invention. The reference numeral 5 designates a resin substrate; 51, a gas barrier layer provided as occasion demands; 52, a coat layer provided as occasion demands. Further, in FIG. 4, the reference numeral 53 is an inorganic oxide layer provided as occasion demands; 54, an $SiO_x$ layer provided as occasion demands; and 55, a transparent electrically conductive film.

The cell substrate according to the present invention can be used preferably for forming a liquid-crystal display, especially a liquid-crystal cell. Particularly for the formation of a liquid-crystal cell, there is preferably used the cell substrate which exhibits transparency so that permeability measured by a spectrophotometer with respect to light having a wavelength of 600 nm is not lower than 60%, especially not lower than 80% when the cell substrate is 0.4 mm thick.

For the formation of the liquid-crystal cell, the cell substrate can be put into practical use as a superimposed substrate with various functional layers such as a phase-difference plate, a polarizing plate, a transparent electrically conductive film, etc. FIG. 4 shows an example of the superimposed substrate with a transparent electrically conductive film 55. In this example, the transparent electrically conductive film 55 is provided through the $SiO_x$ layer 54 for the purpose of improvement of adhesive power, or the like.

Any suitable one selected from indium oxide, tin oxide, indium-tin mixture oxide, gold, platinum, palladium, transparent electrically conductive paint, etc. can be used and any one of known substances can be used for forming the transparent electrically conductive film. Further, the formation of the transparent electrically conductive film can be performed by a method according to the background art, such as a method of additionally providing the transparent electrically conductive film by means of vacuum vapor deposition, sputtering, or the like, a method of applying transparent electrically conductive paint, or the like. Accordingly, the transparent electrically conductive film can be formed directly in the form of a predetermined pattern.

The transparent electrically conductive film which is preferable in terms of prevention of curving of the cell substrate, or the like, in the present invention is a film containing indium-tin mixture oxide as a main component and provided through the $SiO_x$ layer. Incidentally, the formation of the $SiO_x$ layer can be performed by a method according to the aforementioned transparent electrically conductive film forming method.

Figure 5:
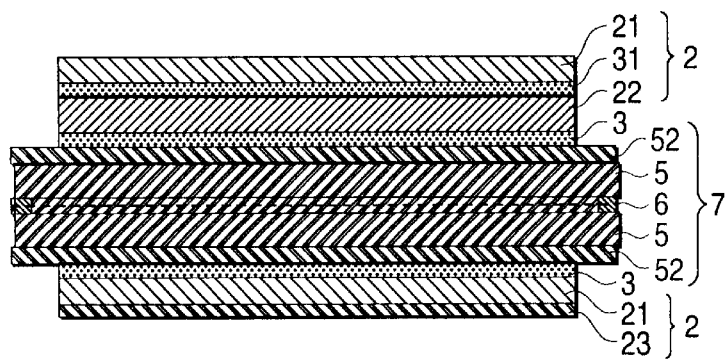
FIG. 5 is a sectional view of an example of a liquid-crystal display.

The formation of the liquid-crystal cell can be performed by a method, or the like, in which cell substrates each having the aforementioned transparent electrically conductive film patterned as an electrode are disposed opposite to each other so that liquid crystal is enclosed between the cell substrates. FIG. 5 shows an example thereof. The reference numeral 7 designates a liquid-crystal cell; and 6, a liquid-crystal layer thereof. An oriented film for liquid-crystal arrangement provided on the transparent electrically conductive film as occasion demands can be also formed by a method according to the background art. The liquid-crystal cell thus formed is of any suitable type such as a TN type, an STN type, a TFT type, a ferroelectric liquid crystal type, or the like. Incidentally, with respect to the cell substrate, the optical member according to the present invention may be adhesively bonded to a resin substrate through the pressure sensitive adhesion layer in advance so that the optical member may be used for forming a liquid-crystal cell.

The liquid-crystal display can be formed as a structure in which the optical member according to the present invention is adhesively bonded, through the pressure sensitive adhesion layer, to either one of or each of the two surfaces of a liquid-crystal cell formed by use of the cell substrate according to the present invention. FIG. 5 shows an example thereof. Incidentally, the liquid-crystal display shown in FIG. 5 is a reflection type display in which a polarizing plate 21 having a reflection layer 23 is provided on the visible back side of the liquid-crystal cell 7.

The optical member may be adhesively bonded to the cell substrate before the formation of the liquid-crystal display or the optical member may be adhesively bonded to the liquid-crystal cell after the formation of the liquid-crystal cell. The adhesive bonding is performed so that the polarizing plate, the phase-difference plate, etc. are located in predetermined arrangement positions. The arrangement positions can be set according to the background art.

When the optical material is made from a polymer film, the optical member according to the present invention has flexibility so as to be applied easily to a curved surface, a large-area surface, etc. For example, the optical member can be applied to any suitable types of liquid-crystal cells such as an active matrix drive type liquid-crystal cell represented by a thin-film transistor type liquid-crystal cell, a simple matrix drive type liquid-crystal cell represented by a TN type liquid-crystal cell or an STN type liquid-crystal cell, etc. so that various liquid-crystal displays can be formed.

EMBODIMENT 1

In a four-necked flask, 100 parts (parts by weight, which shall apply hereinafter) of isooctyl acrylate, 1 part of 6-hydroxyhexyl acrylate and 0.3 parts of azobisisobutyronitrile were added to 200 parts of ethyl acetate to produce a reaction at about 60° C. under stirring to thereby obtain a polymer solution. In the polymer solution, 1 part of an isocyanate type crosslinker per 100 parts of the solid content of the polymer solution was mixed to thereby obtain an acrylic type adhesive agent. The acrylic type adhesive agent was applied onto a separator of a polyester film surface-coated with a silicone type releasant and was heated at 150° C. for 5 minutes to thereby provide a pressure sensitive adhesion layer 25 μm thick. Then, the separator was adhesively bonded to a single surface of a polarizing film to thereby obtain an optical member. Incidentally, the 1000% elastic modulus of the pressure sensitive adhesion layer at 90° C. was 6 g/mm².

On the other hand, a mixture consisting of 100 parts of an alicyclic epoxy resin represented by the following formula, 125 parts of methylhexahydrophthalic anhydride and 1 part of tri-n-butyloctylphosphonium bromide was injected in a mold and cured at 120° C. for 2 hours to thereby obtain a resin substrate 0.4 mm thick. The tensile modulus of elasticity of the substrate is $3.7 \times 10^4$ kgf/cm$^2$.

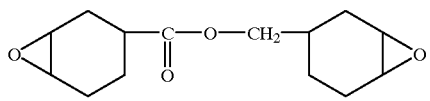

Then, an urethane acrylate type resin represented by the following formula was applied onto a single surface of the aforementioned resin substrate by a spin-coating method and crosslinked by ultraviolet radiation to thereby form a coat layer 5 μm thick. Thus, a cell substrate was obtained.

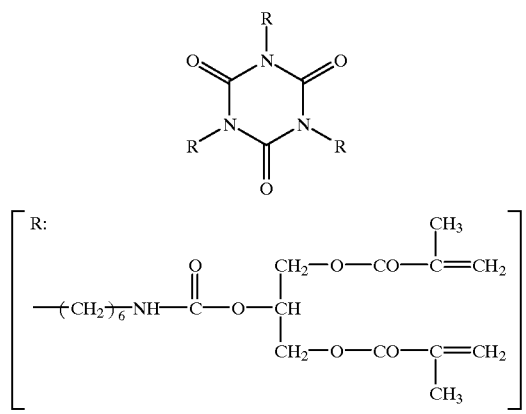

An optical member having the same size as the 12-inch size (185 mm×250 mm) cell substrate obtained as described above was pressure-bonded onto a coating surface of the cell substrate through the pressure sensitive adhesion layer by moving a 2 kg rubber roller forward and backward. After the cell substrate was left in an autoclave at 50° C. under a pressure of 5 atmospheres for 15 minutes so that the adhesively bonded state of the optical member was matured, the cell substrate was cooled to the room temperature. Thus, the cell substrate adhesively bonded to the optical member was obtained.

A liquid-crystal cell was formed by use of a pair of 3.8-inch size (65 mm×86 mm) cell substrates obtained in the above description. An optical member having the same size as the pair of cell substrates and having a pressure sensitive adhesion layer provided on an elliptically polarizing plate formed by lamination of a polarizing plate and a phase-difference plate was pressure-bonded to a single surface of the liquid-crystal cell through the pressure sensitive adhesion layer by moving a 2 kg rubber roller forward and backward (visible side). An optical member having the same size as the pair of cell substrates and having a pressure sensitive adhesion layer provided on a reflection polarizing plate formed by lamination of a polarizing plate and a reflection plate was pressure-bonded to the other surface of the liquid-crystal cell through the pressure sensitive adhesion layer by moving a 2 kg rubber roller forward and backward. After the resulting device was left in an autoclave at 50° C. under a pressure of 5 atmospheres for 15 minutes so that the adhesively bonded state was matured, the resulting device was cooled to the room temperature. Thus, a liquid-crystal display was obtained.

Comparative Example

An acrylic type adhesive agent was prepared in the same manner as in Embodiment 1 except that 5 parts of an isocyanate type crosslinker were added to a mixture of 100 parts of butyl acrylate and 5 parts of acrylic acid substituted for isooctyl acrylate and 6-hydroxyhexyl acrylate. Thus, an optical member, a cell substrate adhesively bonded to the optical member, and a liquid-crystal display were obtained in the same manner as in Embodiment 1. Incidentally, the 1000% elastic modulus of the pressure sensitive adhesion layer at 90° C. was 40 g/mm$^2$.

Evaluation Test

Curl Quantity

Each of the 12-inch size optical member-bonded cell substrates and the 3.8-inch size liquid-crystal displays obtained in Example and Comparative Example was put in a drier at 80° C. for 150 hours and then taken out. Each of the cell substrates and the liquid-crystal displays was cooled to the room temperature for 24 hours. Then, each of the cell substrates and the liquid-crystal displays was placed on a press platen with the polarizing plate (visible side) turned upward and quantities of rising at four corners from the press platen were measured. The average of the quantities was made a curl quantity.

Results of the above description were shown in the following Table.

|  | Embodiment 1 | Comparative Example |
|---|---|---|
| Optical Member-Bonded Cell Substrate (mm per 12 inches) | 2.4 | 6.0 |

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. An optical member comprising:
   an optical material; and
   a pressure sensitive adhesion layer disposed on at least one surface of said optical material and having a 1000% elastic modulus in a range of from 3 g/mm$^2$ to 10 g/mm$^2$ at 90° C.,
   wherein said optical member exhibits characteristic in which a quantity of curl is not larger than 3 mm per 12 inches when said optical member bonded to a resin substrate through said pressure sensitive adhesion layer is heated at 80° C. for 150 hours.

2. An optical member according to claim 1, wherein said optical material is selected from a group consisting of reflection type or other polarizing plates, other polarizing plates, a phase-difference plate, and an elliptically polarizing plate.

3. A cell substrate comprising a resin substrate having a curl quantity of not larger than 3 mm per 12 inches after said cell substrate is heated at 80° C. for 150 hours while an optical member is bonded thereto, said optical member comprising (1) an optical material and (2) a pressure sensitive adhesion layer disposed on at least one surface of said optical material and having a 1000% elastic modulus in a range of from 3 g/mm$^2$ to 10 g/mm$^2$ at 90° C., and said optical member being bonded to said cell substrate through said pressure sensitive adhesion layer.

4. A cell substrate according to claim 3, wherein said resin substrate has a surface coated with an urethane acrylate type curable resin to be adhesively bonded to said pressure sensitive adhesion layer.

5. A cell substrate according to claim 4, wherein said resin substrate comprises an epoxy type resin.

6. A cell substrate according to claim 5, wherein said cell substrate has a tensile modulus of elasticity of not smaller than $3\times10^4$ kgf/cm$^2$.

7. A cell substrate according to claim 4, wherein said cell substrate has a tensile modulus of elasticity of not smaller than $3\times10^4$ kgf/cm$^2$.

8. A cell substrate according to claim 3, wherein said resin substrate comprises an epoxy type resin.

9. A cell substrate according to claim 8, wherein said cell substrate has a tensile modulus of elasticity of not smaller than $3\times10^4$ kgf/cm$^2$.

10. A cell substrate according to claim 3, wherein said cell substrate has a tensile modulus of elasticity of not smaller than $3\times10^4$ kgf/cm$^2$.

11. A liquid-crystal display comprising:
(1) at least one optical member comprising:
an optical material; and
a pressure sensitive adhesion layer disposed on at least one surface of said optical material and having a 1000% elastic modulus in a range of from 3 g/mm$^2$ to 10 g/mm$^2$ at 90° C.; and
(2) a liquid crystal cell bonded to said optical member through said pressure sensitive adhesion layer, said liquid crystal cell comprising a cell substrate having a curl quantity of not larger than 3 mm per 12 inches after said cell substrate is heated at 80° C. for 150 hours while said optical member is bonded thereto.

* * * * *